Patented Oct. 28, 1941

2,260,336

UNITED STATES PATENT OFFICE 2,260,336

METHOD OF PREPARATION OF ORGANIC BORATES

Ralph F. Prescott, Robert C. Dosser, and John J. Sculati, Midland, Mich., assignors to The Dow Chemical Company, Midland, Mich., a corporation of Michigan No Drawing. Application October 16, 1939, Serial No. 299,698

2 Claims. (Cl. 260—462)

This invention concerns an improved method for preparing organo derivatives of boric acid.

According to the present invention, a phenol is reacted with boric acid ($H_3BO_3$) to form tri-aromatic borates having the formula:

$$(R-O-)_3 \equiv B$$

wherein R represents an aromatic radical. In carrying out the reaction, the phenol and boric acid are preferably mixed together in an inert water-immiscible organic solvent and the reaction carried out at the boiling temperature of the reaction mixture. Water formed by the reaction of the phenol with the boric acid is distilled out of the reaction zone along with a portion of the organic solvent. The steam distillation mixture is condensed, collected, and the solvent separated and returned to the reaction mixture. The reaction is preferably carried out at temperatures between about 90° and 150° C., although somewhat higher or lower temperatures may be employed depending upon the particular solvent and phenol present in the reaction mixture. While any suitable proportion of reactants may be employed, from about 2 to 4 molecular equivalents of the phenol for each molecular equivalent of boric acid has been found to give the desired compounds in good yield. The amount of organic solvent present in the reaction mixture is not critical provided that sufficient be maintained in the reaction zone to be steam-distilled along with the water as formed. We generally employ enough of the solvent so that the phenol is dissolved and the final product is obtained in solution. When no more water is evolved from the mixture, the reaction residue may be fractionally distilled to separate the solvent. The distillation residue, consisting essentially of aromatic borates along with traces of such reactants as are employed in molecular excess, may be used in the preparation of fungicidal and germicidal compositions without further purification. Where it is desired to obtain the borates in substantially pure form, such residue may be fractionally distilled under reduced pressure. In any event and regardless of the proportions of reactants, temperatures of reaction, and solvent employed, small amounts of mono- and di-aromatic borates are formed along with the tri-substituted compounds.

The following examples set forth certain embodiments of the invention but are not to be construed as limiting the same.

Example 1

110 grams (1.02 moles) of ortho-cresol, 21 grams (0.34 mole) of boric acid, and 500 milliliters of ethyl benzene were mixed together and heated at 140° C., the boiling temperature of the mixture. A mixture of water and ethyl benzene was continuously distilled out of the reaction zone until no further water could be separated from the steam-distillate mixture. The vapor temperature of the distillate ranged between 130° and 136° C. After 12 hours, the reacted mixture was cooled to room temperature and fractionally distilled under reduced pressure whereby there was recovered 493 milliliters of ethyl benzene and 73 grams of tri-(orthotolyl) borate, boiling at 198° C. at 0.1 inch pressure, as a straw-colored viscous liquid soluble in most organic solvents and hydrolyzing readily on contact with water.

Example 2

In a similar manner 376 grams (4 moles) of phenol, 62 grams (1 mole) of boric acid and 465 milliliters of isopropyl benzene were mixed together and heated to approximately the boiling temperature of the solvent for a period of 4 hours. At the end of this time no more water was distilled out of the reaction mixture and the solution of crude borate was fractionally distilled. The isopropyl benzene employed as a solvent was recovered as a low-boiling fraction in the distillation. Low-boiling fractions consisted of isopropyl benzene and approximately 1 mole of unreacted phenol. 213 grams of triphenyl borate was obtained as the major product of reaction, boiling at 205°–215° C. at 0.25 inch pressure.

In a similar manner other phenols were reacted with boric acid in the presence of such inert water-immiscible solvents as orthodichlorobenzene, chlorobenzene, benzene, carbontetrachloride, ethylene chloride, and the like. The following tri-aromatic borates are representative of those obtained:

Tri-(2-phenyl-phenyl) borate, boiling at 320°–330° C. at 0.3 inch pressure.

Tri-(4-tertiarybutyl-phenyl) borate, boiling at 275°–280° C. at 0.1 inch pressure.

Tri-(4-cyclohexyl-phenyl) borate, boiling at 370°–375° C. at 0.15 inch pressure.

Tri-(2-cyclohexyl-phenyl) borate, boiling at 280°–285° C. at 0.1 inch pressure.

Tri-(4-chloro-phenyl) borate, boiling at 260°–270° C. at 0.15 inch pressure.

Tri-(2-phenyl-4-chloro-phenyl) borate, boiling at 242°–248° C. at 0.15 inch pressure.

Tri-(alpha-naphthyl) borate, boiling at 325°–330° C. at 0.2 inch pressure.

Tri-(2-methoxy-phenyl) borate, boiling at 230° C. at 0.1 inch pressure.

In a similar manner other common phenols may be reacted with boric acid to obtain compounds analogous to those described above. Representative of such phenols are 3.5-dimethyl phenol, 4-tertiary-octyl phenol, 2-normal-hexyl phenol, 2-benzyl phenol, 4-allyl phenol, 2-chloro-4-tertiary-butyl phenol, 2-phenyl-4-isopropyl phenol, 2.6-dibromo-4-phenyl phenol, 2.6-diisopropyl-4-phenyl phenol, 2-chloro-4-cyclohexyl phenol, 2.4-dinitro-6-cyclohexyl phenol, 4-cyclopentyl phenol, 3-bromo phenol, 3-phenyl phenol, 2-chloro-alpha naphthol, 4-isopropyl-alpha-naphthol, 4-octadecyl phenol, phenanthrol, alpha-anthrol, ethyl ester of parahydroxy benzoic acid, etc.

Those of the above compounds which are novel and to which the present invention is directed in part have the following formula

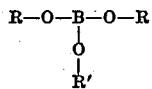

wherein R represents an aromatic radical and R' represents a polynuclear aromatic radical, e. g. diphenyl, cyclohexyl phenyl, naphthyl, anthryl, benzyl phenyl, and the like, and nuclear-substituted derivatives thereof. These compounds have been found for the most part to be high-boiling viscous liquids which may solidify on standing. They are somewhat soluble in most common organic solvents and hydrolyze readily on contact with water to form boric acid and the free phenol. These compounds are useful in the preparation of fungicidal and germicidal compositions. A particular application lies in the preparation of substantially non-aqueous solutions which may be diluted with water to obtain relatively fine dispersions of the particular phenol concerned in a solution of boric acid.

While in each of the compounds set forth in the foregoing examples the three substituting aromatic groups are similar, compounds in which R and R', as shown in the formula, are different aromatic radicals may be prepared by reacting mixtures of phenols with boric acid. For example, such compounds as monocyclohexyl-phenyl-diphenyl borate may be formed by reacting a mixture of 2 molecular equivalents of phenol and 1 molecular equivalent of cyclohexyl phenyl with 1 molecular equivalent of boric acid. Similarly, isomeric mixtures of the phenyl phenols, cyclohexyl phenols, or halogen or alkyl derivatives thereof or of alpha- and beta-naphthol may be reacted with boric acid to obtain mixed tri-aromatic borates. Such compounds have particular utility where it is desired to obtain germicidal or fungicidal compositions comprising several phenols in view of the specific selective action displayed by many phenolic derivatives against organisms.

Other modes of applying the principle of our invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. In a method of preparing organo derivatives of boric acid having the general formula $$(R\!-\!O\!-\!)_3 \equiv B$$

wherein R represents an aromatic radical, the step which consists of heating a mixture of boric acid, a monohydric phenol, and a water-immiscible organic solvent to a temperature at which a mixture of the solvent and water of reaction is steam-distilled from the reaction zone.

2. In a method of preparing organo derivatives of boric acid having the general formula $$(R\!-\!O\!-\!)_3 \equiv B$$

wherein R represents an aromatic radical, the step which consists of heating a mixture of boric acid, a monohydric phenol, and a water-immiscible organic solvent to a temperature between 90° and 150° C. whereby a portion of the solvent is steam-distilled along with the water of reaction.

RALPH F. PRESCOTT.
ROBERT C. DOSSER.
JOHN J. SCULATI.